US008800919B2

(12) United States Patent
Ferrier et al.

(10) Patent No.: US 8,800,919 B2
(45) Date of Patent: Aug. 12, 2014

(54) LANDING GEAR PROVIDED WITH ENERGY ABSORBER MEANS, AN AIRCRAFT PROVIDED WITH SAID LANDING GEAR, AND A METHOD OF LANDING

(75) Inventors: Jean-Jacques Ferrier, Velaux (FR); Pierre Prudhomme-Lacroix, Vitrolles (FR)

(73) Assignee: Airbus Helicopters, Marignane Cedex (FR)

( * ) Notice: Subject to any disclaimer, the term of this patent is extended or adjusted under 35 U.S.C. 154(b) by 454 days.

(21) Appl. No.: 13/088,804

(22) Filed: Apr. 18, 2011

(65) Prior Publication Data

US 2011/0260001 A1 Oct. 27, 2011

(30) Foreign Application Priority Data

Apr. 26, 2010 (FR) ...................... 10 01775

(51) Int. Cl.
 *B64C 25/56* (2006.01)
(52) U.S. Cl.
 USPC ...................................... 244/100 A
(58) Field of Classification Search
 USPC ............................. 244/100 A, 146
 See application file for complete search history.

(56) References Cited

U.S. PATENT DOCUMENTS

| 2,621,874 | A | | 12/1952 | Boyle | |
|---|---|---|---|---|---|
| 5,259,574 | A | * | 11/1993 | Carrot | 244/100 A |
| 5,992,794 | A | * | 11/1999 | Rotman et al. | 244/17.17 |
| 6,338,456 | B1 | * | 1/2002 | Cairo-Iocco et al. | 244/139 |
| 6,371,410 | B1 | * | 4/2002 | Cairo-Iocco et al. | 244/100 A |
| 7,954,752 | B2 | * | 6/2011 | Smith et al. | 244/17.17 |
| 2010/0206983 | A1 | * | 8/2010 | Tho et al. | 244/100 A |
| 2011/0204181 | A1 | * | 8/2011 | Hill et al. | 244/100 A |

FOREIGN PATENT DOCUMENTS

| DE | 20209258 U1 | 9/2002 |
|---|---|---|
| EP | 0869058 A2 | 10/1998 |
| WO | 9200876 A1 | 1/1992 |
| WO | 2008054401 A2 | 5/2008 |

OTHER PUBLICATIONS

Search Report and Written Opinion; Application No. FR 1001775; dated Dec. 15, 2010.

* cited by examiner

*Primary Examiner* — Rob Swiatek
*Assistant Examiner* — Timothy Schwarz
(74) *Attorney, Agent, or Firm* — Brooks Kushman P.C.

(57) ABSTRACT

Aircraft landing gear (10) provided with at least one contact means (20) for making contact with a contact surface (S). The landing gear includes energy absorber means (30) provided with an inflatable airbag (31) secured to said contact means (20), said energy absorber means (30) being provided with control means (32) and with at least one inflation means (32) for inflating said airbag (31) under the control of said control means (32), said energy absorber means (30) including adjuster means (34) for adjusting the pressure that exists inside (INT) said airbag (31).

18 Claims, 2 Drawing Sheets

LANDING GEAR PROVIDED WITH ENERGY ABSORBER MEANS, AN AIRCRAFT PROVIDED WITH SAID LANDING GEAR, AND A METHOD OF LANDING

CROSS REFERENCE TO RELATED APPLICATIONS

This application claims the benefit of FR 10 01775 filed on Apr. 26, 2010, the disclosure of which is incorporated in its entirety by reference herein.

BACKGROUND OF THE INVENTION (1) Field of the Invention

The present invention relates to landing gear provided with energy absorber means, to an aircraft provided with said landing gear, and to a method of landing.

(2) Description of Related Art

Conventionally, an aircraft includes landing gear via which it stands on a contact surface. It should be observed that in the text below, the term "contact surface" is used to mean the contact surface against which the contact means bear on landing. For example, the contact surface may include ground as such, the deck of the ship, the roof of a building, or indeed a liquid surface such as water in particular when alighting at sea.

For example, the landing gear may be provided with three or four wheeled undercarriages that constitute a polygon for supporting the aircraft. Landing gear is also known that is provided with skids.

Such landing gear may be retractable in order to improve the aerodynamic drag of the aircraft. The most prominent elements of the aircraft are folded into the fuselage, and in particular retractable undercarriages of the landing gear. More precisely, each undercarriage is retracted in flight into a compartment conventionally referred to as a "wheel well", ready to be deployed at the required moment prior to landing.

Civil certification regulations, e.g. known under the acronyms "FAR", "JAR", or "EASA-CS" (for European aviation safety agency certification specification) require undercarriages to absorb certain levels of kinetic energy.

Thus, according to such civil certification regulations, an undercarriage must be capable of absorbing the kinetic energy of an aircraft at a first predetermined vertical speed of impact against the contact surface without that leading to permanent deformation of the components making up the undercarriage, and with this applying for various attitudes of the aircraft on touchdown and for the most unfavorable conditions of weight and centering. It should be observed that plastic deformation of certain elements of a skid undercarriage may be acceptable.

Likewise, each undercarriage must be capable of absorbing the kinetic energy of an aircraft at a second predetermined vertical speed of impact against the contact surface, which second speed is greater than said first speed, and without breaking the components that constitute the undercarriage, for various attitudes of the aircraft on touchdown and for the most unfavorable conditions of weight and centering.

Landing gear complying with civil certification requirements is referred to for convenience as a "standard" landing gear.

Such standard landing gear is most effective and serves to satisfy the requirements of civil certification regulations. Nevertheless, it can be understood that standard landing gear is sometimes not suited to vertical speeds of impact against the contact surface that are faster than the speed defined by the civil regulation. Similarly, it can readily be understood that standard landing gear is ineffective on water since it penetrates into the water without absorbing significant energy.

Unfortunately, in the event of a crash, the aircraft may be confronted with vertical speeds that are faster than the speeds set down by civil certification regulations. The landing gear can then be damaged, since the landing gear is then subjected to forces for which, by definition, it was not initially designed. Similarly, those forces greater than the usual forces are applied to the structure of the aircraft via the fastening points of the landing gear and, as a result, can give rise to dangerous damage.

In addition to civil certification regulations, there also exist military qualification regulations, e.g. known under the name "MIL-S-8698" or naval qualification regulations, e.g. known under the name "AR56" that are more severe than civil certification regulations. These military qualification regulations set down vertical speeds that are faster than the above-mentioned first and second vertical speeds.

Under such circumstances, standard landing gear does not necessarily comply with military qualification regulations.

Furthermore, it should be observed that standard landing gear does not absorb energy when ditching on water.

Document WO 2008/054401 presents additional energy absorber means.

Those energy absorber means comprise an inflatable cushion, usually known as an "airbag", that is arranged under the bottom portion of a helicopter fuselage.

Furthermore, the energy absorber means are provided with a first source of gas for inflating the airbag, a second source of gas for reinflating the airbag, and an air vent that may be in an open position or in a closed position.

The system described is advantageous insofar as it provides the aircraft with additional capacity to absorb energy. Nevertheless, it will be understood that the bottom portion of the fuselage needs to be reinforced in order to withstand the forces that result from landing, since the fuselage is not normally dimensioned for that purpose.

Furthermore, the bottom portion must not possess elements that might damage the airbag, such as antennas, for example.

As a result it would appear to be difficult to implement that solution on an existing aircraft without giving rise to constraints, or at least to difficulties, and in any event to modifications and to reinforcements.

Also known are the following documents: DE 202 09 258 U1, U.S. Pat. No. 2,621,874 A, EP 0 869 058 A2, and WO 92/00876 A1.

SUMMARY OF THE INVENTION

An object of the present invention is thus to propose landing gear provided with energy absorber means capable of being implemented easily on an existing aircraft without major structural modifications to the aircraft so as to enable it to land under extreme conditions, i.e. at high vertical speeds, or indeed on soft surfaces.

According to the invention, aircraft landing gear provided with at least one contact means for making contact with a contact surface is remarkable in that it includes energy absorber means provided with an inflatable airbag secured to the contact means and suitable for interposing itself between said contact surface and said contact means, the energy absorber means being provided with control means and with at least one inflation means for inflating said airbag under the control of said control means, the energy absorber means including adjuster means for adjusting the pressure that exists inside said airbag.

The inflation means may be of an already-existing type, for example of the kind used for inflating an automobile airbag. The inflation means may comprise a supply of compressed air or any other existing means.

The control means may include a button that is operable by an occupant of the aircraft, or indeed a computer that triggers inflation under predetermined conditions.

The airbag of the energy absorber means may be secured to the contact means of existing landing gear, or may be incorporated in said contact means, e.g. during fabrication thereof.

When the aircraft is landing at a high vertical speed, e.g. a speed that is higher than the vertical speeds mentioned in civil certification regulations, the control means activate the inflation means to cause the airbag to be inflated. The airbag then deploys so as to interpose itself between the contact means and the contact surface.

The aircraft fitted with the landing gear of the invention then comes into contact with the contact surface via the airbag. The pressure inside the airbag then increases, with said pressure being controlled by the adjuster means, in particular to avoid a rebound effect, or even to avoid the airbag exploding.

The airbag thus absorbs a fraction of the energy that results from landing, with the remainder of said energy being absorbed by the members of the landing gear. The combination of the airbag with standard landing gear makes it possible to increase the vertical speed of the aircraft at the time of landing, e.g. by a factor of two, compared with standard landing gear that does not have the above-described energy absorber means.

Furthermore, landing generates loads while the airbag is being flattened that are of the same order of magnitude as the loads that are normally applied to the means connecting the landing gear to the fuselage. Furthermore, the forces from the airbag pass via said means. As a result the invention does not involve reinforcing the fuselage.

The landing gear with the inflatable airbag can thus be installed at lower cost on an existing aircraft.

Furthermore, the airbag may act as a contact surface when alighting on water so as to enable the landing gear to perform its function of absorbing energy, and also so as to provide temporary buoyancy in order to save the passengers of the aircraft.

In variants, the invention may include one or more of the following characteristics.

For example, the contact means may equally well be a wheel, a skid, or a ski.

The contact means may comprise a wheel provided with a tire, and the airbag is folded inside the tire, the airbag exploding the tire when it is inflated by the inflation means under the control of the control means in order to interpose itself between the contact means and the control surface.

The airbag may also be fastened to the wheel axle, for example, possibly outside the tire.

In addition, the airbag may be folded inside a container secured to the contact means, the airbag exploding the container when it is inflated by the inflation means under the control of the control means in order to interpose itself between the contact means and the contact surface.

The container may be fastened to existing contact means or indeed it may constitute a portion of the contact means. For example, the contact means may have an elongate bearing portion and the container may be fastened to said elongate portion.

Furthermore, the adjuster means may comprise at least one orifice open to the inside of the airbag, the orifice serving to vent the airbag.

Each open orifice may merely be a throttling orifice. In other variants, the open orifice may be an orifice of a valve presenting controlled opening that opens when a predetermined pressure is reached inside said airbag, such as a release valve or a valve of the type described in document WO 2008/054401.

With an open orifice in a valve with controlled opening, the valve may be controlled by a control member, for example, and the control member may be distinct from the control means or it may be incorporated in the control means.

Optionally, the valve has a flow section that is variable depending on the pressure that exists inside the airbag, the valve optionally having a diaphragm controlled by a control member as a function of a pressure sensor arranged inside the airbag, for example.

Furthermore, with the contact means being dimensioned to withstand the forces that result from landing at a predetermined vertical speed, e.g. the fastest vertical speed mentioned by civil certification regulations, the open orifice may be dimensioned to allow said contact means to make contact with the contact surface at said predetermined vertical speed.

Thus, the contact means make contact with the contact surface after the airbag has performed work, under conditions that are close to those of the conditions set down in the regulations.

Furthermore, in an automatic embodiment, the energy absorber means are optionally provided with detector means for detecting an imminent impact and delivering at least one measurement signal to the control means relating to an imminent impact with the contact surface.

The means for detecting an imminent impact serve to determine whether the aircraft is, in the short term, about to be subjected to a non-standard impact, so as to allow the control means to cause the airbag to be fully inflated before said impact.

The impact detector means may comprise a height detector to detect height relative to a contact surface and/or a vertical speed detector to detect the vertical speed of the contact means.

In one method, when the vertical speed of the aircraft exceeds a first predetermined threshold, and when the height between the aircraft and the contact surface becomes less than a second predetermined threshold, the control means cause the airbag to inflate.

It should be observed that apart from the airbag that is secured to the contact means, the other members of the energy absorber means may be located elsewhere, e.g. on the fuselage to which the landing gear is fastened.

In addition to providing landing gear, the invention also provides an aircraft. Such an aircraft is remarkable in particular in that it includes landing gear of the invention.

Furthermore, the invention also provides a method of landing for touching an aircraft down on a contact surface, said aircraft having landing gear provided with at least one contact means, said aircraft including energy absorber means provided with an inflatable airbag secured to said contact means, said energy absorber means being provided with control means and at least one inflation means for inflating said airbag under the control of said control means, said energy absorber means including adjuster means for adjusting the pressure that exists in the inside of said airbag, during which method said airbag is inflated equally well:

either when the height between said contact means and said contact surface is less than a predetermined threshold height while a vertical speed of said contact means is greater than a predetermined vertical speed, i.e. when a non-standard imminent impact is detected by means for detecting an imminent impact; or else when said contact surface comprises a flexible material into which the contact means might penetrate;

and after said airbag has been inflated, the adjuster means are used to adjust the pressure that exists in the inside of said airbag in order to enable said contact means to make contact with the contact surface at said predetermined vertical speed.

It can be understood that by virtue of its volume, the airbag presents resistance to penetration into a flexible material such as water, mud, or even snow. This obtains significant energy absorption in the event of alighting in water, which is impossible with conventional landing gear.

BRIEF DESCRIPTION OF THE DRAWINGS

The invention and its advantages appear in greater detail from the following description of embodiments given by way of illustration and with reference to the accompanying figures, in which.

Elements that are present in more than one of the figures are given the same references in each of them.

DETAILED DESCRIPTION OF THE PREFERRED EMBODIMENTS

Figure 1:
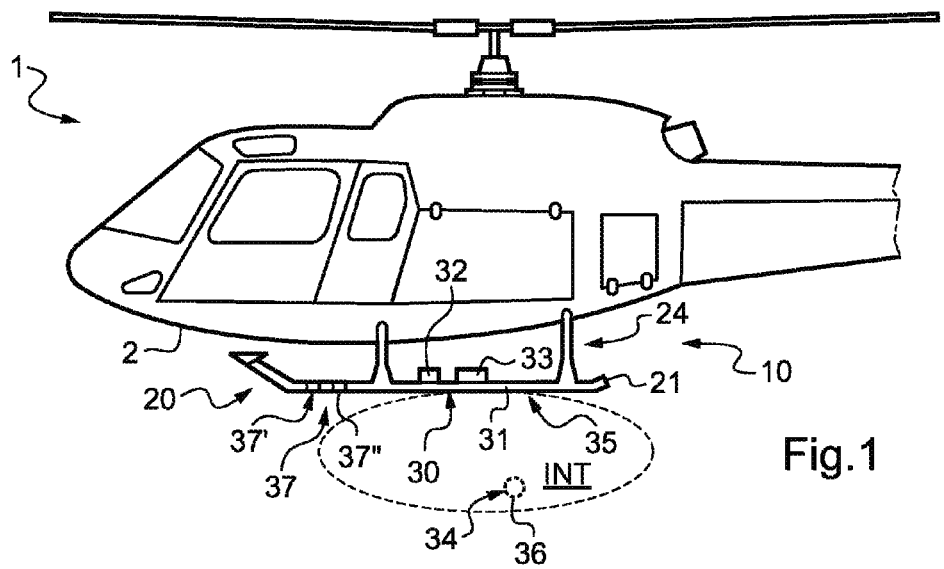
FIG. 1 is a diagram showing an aircraft provided with landing gear of the invention.

FIG. 1 shows an aircraft 1 having landing gear 20 of the invention, and more particularly it shows a helicopter type rotorcraft.

The landing gear 20 shown in FIG. 1 is provided with contact means 20 for making contact with a contact surface, specifically it is provided with two skids 21 connected via two connecting cross-members 24 to the fuselage 2 of the aircraft 1.

The landing gear is also fitted with at least one energy absorber means 30 suitable, in the event of a non-standard landing, for absorbing extra energy relative to the assembly comprising the contact means and the means connecting the contact means to the fuselage 2, i.e. the skids 12 and the cross-members 24 in FIG. 1.

The energy absorber means 30 are provided with at least one inflatable airbag 31 secured to a contact means 20. It should be observed that when the landing gear has a plurality of elongate contact means of the ski or skid 21 type, it is advantageous to provide one inflatable airbag per elongate contact means. In contrast, if the landing gear has a plurality of wheel type contact means, then the landing gear may possess a single airbag 31 secured to one of the contact means.

Furthermore, the energy absorber means 30 possess at least one control means 32 and at least one inflation means suitable for inflating each airbag 31 on command of the control means 32. If the landing gear has a plurality of airbags 31, it is possible to make provision for one or more inflation means and one or more control means.

It should be observed that it is advantageous to provide single inflation means for all of the airbags. For example, if there are two airbags fitted respectively to two contact means of the landing gear, it is advantageous to have single inflation means for avoiding having only one airbag in place since that would run the risk of causing the aircraft to topple over.

The dashed lines show the airbag 31 deployed, i.e. inflated.

In a first variant, the control means 32 may comprise a computer, a processor, or the equivalent, that automatically triggers inflation of the airbag 31 as a function of determined criteria.

In this variant, the energy absorber means 30 may be provided with detector means 37 for detecting an inevitable imminent impact with the contact surface. The airbag 31 is then inflated when such an imminent impact is detected.

For example, the detector means 37 may include a height detector 37' for detecting height relative to the contact surface and/or a vertical speed detector 37", both of which are connected to the control means. As a function of the measurement signals coming from these detectors, the control means command the inflation means to feed gas to the airbag 31.

It should be observed that the control means 32, the inflation means 33, and the detector means 37 are fastened to the contact means 21. Nevertheless, it can be understood that these members could be offset to be carried on the fuselage of the aircraft, or indeed inside it.

In a second variant, the control means comprise a control member operable by an occupant of the aircraft, such as a button that can be pressed by a passenger or a pilot, in order to request inflation of the airbag 31 manually.

In a third variant, the energy absorber means 30 comprise manual control means and a computer so as to allow both a manual mode of operation and an automatic mode of operation.

Furthermore, the energy absorber means 30 include adjuster means 34 for adjusting the pressure that exists in the inside INT of the airbag.

The adjuster means 34 optionally comprise at least one orifice 36 opening out to the inside INT of the airbag 31. It can be understood that the orifice 36 does not prevent the airbag 31 inflating insofar as the flow rate of gas entering into the airbag 31 under drive from the inflation means is faster than the flow rate of gas leaving through the orifice 36.

The orifice 36 may also be incorporated within a controlled opening valve, or indeed in a vent.

Furthermore, in order to be secured to contact means, the airbag 31 is folded inside a container 35 that is secured to the contact means. It can be understood that the container has built-in weakness so as to enable the airbag to break it and take up a position between the contact means and the contact surface.

Figure 2:
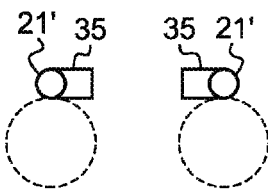
FIG. 2 is a section through said landing gear.

With reference to FIG. 1, where the contact member is an elongate member of the ski or skid type, the container may be fastened to the elongate element. For example, with reference to FIG. 2, the contact means comprise a tube 21', and the container is fastened on one side of a portion of the tube 21', in the contact plane of the landing gear.

Figure 3:
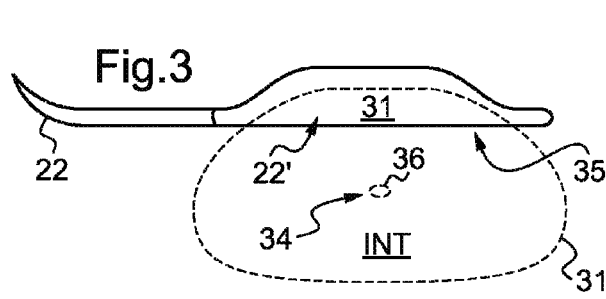
FIG. 3 is a diagrammatic longitudinal section of an elongate portion of contact means.
Figure 4:
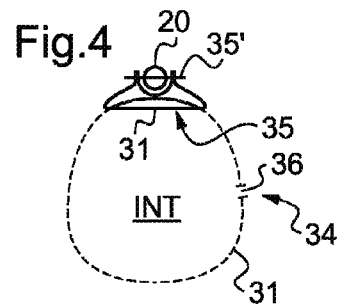
FIG. 4 is a diagrammatic cross-section of an elongate portion of contact means.

With reference to FIGS. 3 and 4 that show elongate contact means of the ski type 22, the elongate member of the contact means presents a concave side in which the container 35 is arranged, the container being fastened to the contact means by conventional dedicated means 35'. Thus, the container is arranged under the contact means, and essentially between the contact means and a contact surface, but it does not project from the plane of contact between the landing gear and said contact surface.

This variant is also applicable to a skid landing gear.

Figure 5:
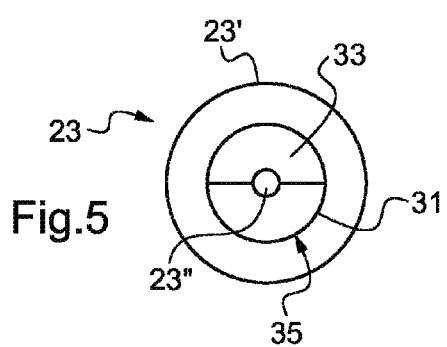
FIG. 5 shows a variant of energy absorber means provided with an airbag arranged on wheeled landing gear, inside a tire.
Figure 6:
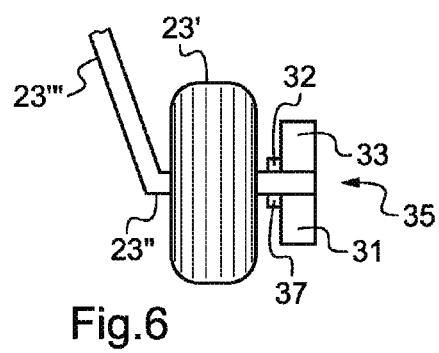
FIG. 6 shows a variant of energy absorber means provided with an airbag arranged on wheeled landing gear, outside a tire.

With reference to FIGS. 5 and 6, the contact means comprise a wheel 23 provided with a tire 23' arranged on an axle 23" for the wheel.

In the variant of FIG. 5, the container 35 containing the folded airbag 31 may be located inside the tire 23', together with the inflation member 33, for example.

In the variant of FIG. 6, the container 35 may be fastened to the wheel axle, outside the tire 23'. This variant presents the advantage of not exploding the tire when the airbag 31 is inflated.

Under such circumstances, depending on the variant, the container may be arranged inside the contact means or it may be secured to the contact means.

Figure 7:
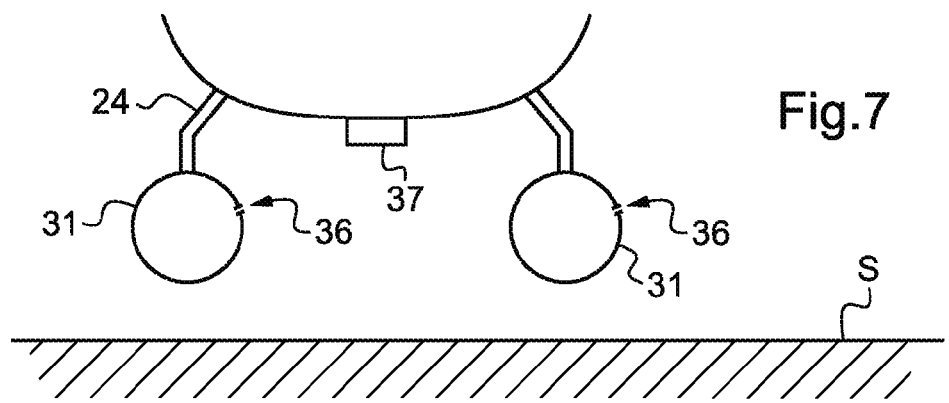
FIGS. 7 to 9 are diagrams explaining the operation of the landing gear.
Figure 8:
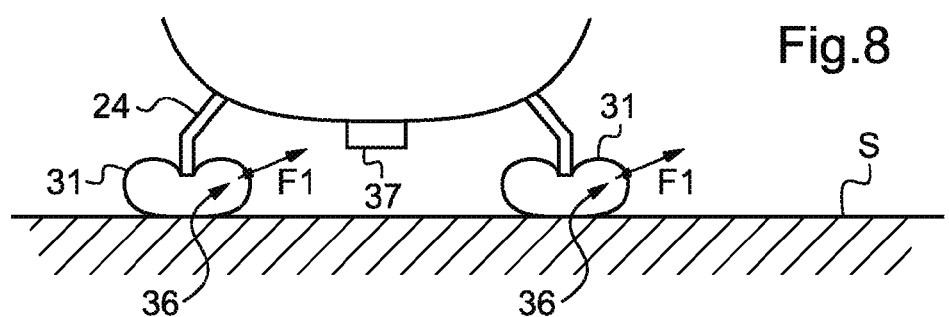
Figure 9:
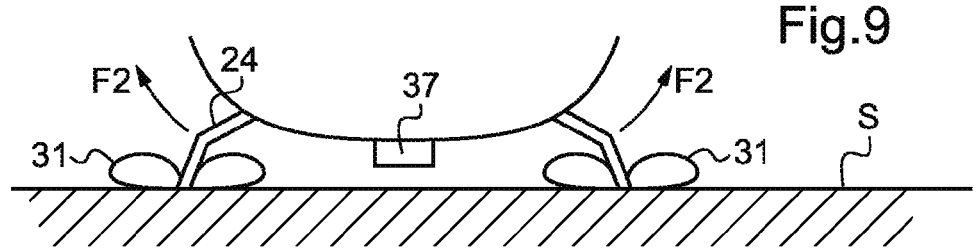

FIGS. 7 to 9 explain the operation of the invention.

With reference to FIG. 7, in the proximity of the contact surface S, and prior to making contact with the contact surface S, the inflatable airbags 31 are inflated, i.e. two airbags 31 that are secured respectively to two contact means.

With reference to FIG. 8, the aircraft 1 strikes the contact surface S via the airbags 31 and continues to move downwards.

Each of the contact means exerts pressure on the associated airbag 31. The gas present in the airbag escapes via the orifice 36 as shown by arrows F1. During this stage, the airbags 31 absorb a fraction of the energy that results from the landing, thereby tending to brake the vertical speed of the aircraft. It should be observed that during this stage, the forces generated on the landing gear remain less than or equal to the usual operating forces on the landing gear. Additional energy absorption is thus obtained without increasing the forces on the landing gear and the structure.

In cross-section, each airbag 31 thus takes up a kidney-bean shape.

With reference to FIG. 9, the contact means 20 finally reach the contact surface S. The contact means then co-operate with the conventional landing gear means to absorb the remaining energy.

For example, on skid landing gear as shown, the cross-members 24 move in the direction of arrows F2. With wheeled landing gear, a shock absorber then tends to absorb said energy.

It should be observed that since each contact means is dimensioned to withstand the forces that result from landing at a predetermined vertical speed, jointly with said conventional means, the open orifice 36 is dimensioned to enable the contact means to make contact with the contact surface S at said predetermined vertical speed.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. Aircraft landing gear provided with at least one contact means for making contact with a contact surface (S), wherein the landing gear includes energy absorber means provided with an inflatable airbag secured to said contact means and suitable for interposing itself between said contact surface (S) and said contact means, said energy absorber means being provided with control means and with at least one inflation means for inflating said airbag under the control of said control means, said energy absorber means including adjuster means for adjusting the pressure that exists inside (INT) said airbag, said adjuster means comprising at least one orifice open to the inside (INT) of the airbag, said contact means being dimensioned to withstand the forces that result from landing at a predetermined vertical speed, said open orifice being dimensioned to enable said contact means to make contact with the contact surface (S) at said predetermined vertical speed.

2. Landing gear according to claim 1, wherein said contact means is at least one of a wheel, a skid, or a ski.

3. Landing gear according to claim 1, wherein said airbag is folded inside a container secured to said contact means, said airbag exploding the container when it is inflated by said inflation means under the control of said control means in order to interpose itself between said contact means and the contact surface (S).

4. Landing gear according to claim 1, wherein said energy absorber means are provided with detector means for detecting an imminent impact and delivering at least one measurement signal to said control means relating to an imminent impact with the contact surface.

5. Landing gear according to claim 4, wherein said impact detector means comprise a height detector for detecting height relative to the contact surface (S).

6. Landing gear according to claim 4, wherein said impact detector means comprise a vertical speed detector for detecting the vertical speed of said contact means.

7. An aircraft, including landing gear according to claim 1.

8. Landing gear according to claim 1, wherein the contact means comprises a wheel having a tire arranged on an axle and the landing gear further comprises an explodable container fastened to the axle outside the wheel, the airbag being folded inside the container.

9. The aircraft landing gear of claim 1, wherein the adjuster means comprises a valve and a valve controller configured to vary a flow area of the valve in response to a measured pressure inside the airbag.

10. A method of landing for touching an aircraft down on a contact surface, said aircraft having landing gear provided with at least one contact means, said aircraft including energy absorber means provided with an inflatable airbag secured to said contact means and suitable for interposing itself between said contact surface (S) and said contact means, said energy absorber means being provided with control means and at least one inflation means for inflating said airbag under the control of said control means, said energy absorber means including adjuster means for adjusting the pressure that exists in the inside (INT) of said airbag, during which method said airbag is inflated equally well:
    either when the height between said contact means and said contact surface is less than a predetermined threshold height while a vertical speed of said contact means is greater than a predetermined vertical speed; or
    else when said contact surface comprises a flexible material into which the contact means might penetrate;
    and after said airbag has been inflated, the adjuster means are used to adjust the pressure that exists in the inside (INT) of said airbag in order to enable said contact means to make contact with the contact surface (S) at said predetermined vertical speed.

11. An energy absorber for an aircraft landing gear, the landing gear being connected to an aircraft fuselage and having a contact point for contacting a landing area, the landing gear being configured to withstand a landing at a vertical speed threshold, the energy absorber comprising:

an inflatable airbag secured to the landing gear and configured to interpose between the contact point and the landing area upon activation;

a controller;

an inflation device associated with the airbag and configured to inflate the airbag in response to a command from the controller; and a pressure adjuster associated with the airbag and configured to adjust the pressure inside the airbag to reduce an aircraft velocity to the vertical speed threshold.

12. The energy absorber of claim 11, wherein the pressure adjuster comprises an orifice open to the airbag, the orifice being sized to relieve pressure inside the airbag at a controlled rate to reduce the aircraft velocity to the vertical speed threshold.

13. The energy absorber of claim 11, wherein the pressure adjuster comprises a valve and a valve controller configured to open the valve when a predetermined pressure is reached inside the airbag.

14. The energy absorber of claim 11, wherein the controller is configured to command the inflation device to inflate the airbag in response to a detected water landing.

15. The energy absorber of claim 11, wherein the landing gear comprises an axle supporting a vehicle wheel and the airbag is secured to the axle outside the wheel.

16. The energy absorber of claim 11, wherein the landing gear comprises a skid and the airbag is folded within a container secured to the skid.

17. The energy absorber of claim 16, wherein the skid has a first lateral portion and a second lateral portion and the airbag is configured to interpose between the first lateral portion and the landing area upon activation with the second lateral portion being uncovered.

18. The energy absorber of claim 11, wherein the pressure adjuster comprises a valve and a valve controller configured to vary a flow area of the valve in response to a measured pressure inside the airbag.

* * * * *